United States Patent
Piet

(10) Patent No.: US 6,868,838 B2
(45) Date of Patent: Mar. 22, 2005

(54) FUEL INJECTION SYSTEM FOR A DIESEL ENGINE WITH RECYCLING

(75) Inventor: Patrick Piet, Puteaux (FR)

(73) Assignee: Peugeot Citroen Automobiles S.A., Velizy Villacoublay (FR)

( * ) Notice: Subject to any disclaimer, the term of this patent is extended or adjusted under 35 U.S.C. 154(b) by 0 days.

(21) Appl. No.: 10/492,817

(22) PCT Filed: Oct. 22, 2002

(86) PCT No.: PCT/FR02/03612
§ 371 (c)(1),
(2), (4) Date: Sep. 23, 2004

(87) PCT Pub. No.: WO03/036074
PCT Pub. Date: May 1, 2003

(65) Prior Publication Data
US 2005/0022794 A1 Feb. 3, 2005

(30) Foreign Application Priority Data
Oct. 22, 2001 (FR) ............................. 01 13616

(51) Int. Cl.$^7$ ..................... F02M 31/20; F02M 53/00
(52) U.S. Cl. ..................... 123/541; 123/557; 123/514
(58) Field of Search ..................... 123/557, 541, 123/514, 41.31, 456

(56) References Cited

U.S. PATENT DOCUMENTS

| | | | | |
|---|---|---|---|---|
| 3,973,536 A | * | 8/1976 | Zelders | 123/541 |
| 4,187,813 A | * | 2/1980 | Stumpp | 123/510 |
| 4,411,239 A | * | 10/1983 | Kelch | 123/557 |
| 4,600,825 A | * | 7/1986 | Blazejovsky | 219/205 |
| 4,763,611 A | * | 8/1988 | Kobayashi et al. | 123/41.31 |
| 4,869,218 A | * | 9/1989 | Fehlmann et al. | 123/357 |
| 4,872,438 A | * | 10/1989 | Ausiello et al. | 123/514 |
| 4,924,822 A | * | 5/1990 | Asai et al. | 123/27 GE |
| 4,933,093 A | * | 6/1990 | Keller | 210/774 |
| 5,865,158 A | | 2/1999 | Cleveland et al. | |
| 6,234,151 B1 | | 5/2001 | Eck | |
| 6,729,310 B2 | * | 5/2004 | Ekstam | 123/516 |

FOREIGN PATENT DOCUMENTS

| | | |
|---|---|---|
| DE | 195 43 538 | 5/1997 |
| DE | 196 31 981 | 2/1998 |
| DE | 199 41 689 | 3/2001 |
| FR | 2 773 591 | 1/1998 |

\* cited by examiner

Primary Examiner—Carl S. Miller
(74) Attorney, Agent, or Firm—Leydig, Voit & Mayer, Ltd.

(57) ABSTRACT

The invention relates to a fuel injection system for a diesel engine cooled by a cooling water circuit comprising a storage tank, a distribution system, an injection harness and a draining circuit. The distribution system comprises a pump and a device for the selective heating of the fresh fuel flow before admission into the pump, and the injection harness injects part of the fuel into the engine. The draining circuit comprises a device for cooling the flow of non-injected fuel, and is used for the selective return of the flow toward the storage tank. The selective heating device comprises a recycle line and a direction setting element which can be used selectively to recycle the flow of non-injected fuel upstream of the pump.

9 Claims, 4 Drawing Sheets

FUEL INJECTION SYSTEM FOR A DIESEL ENGINE WITH RECYCLING

Figure 1:
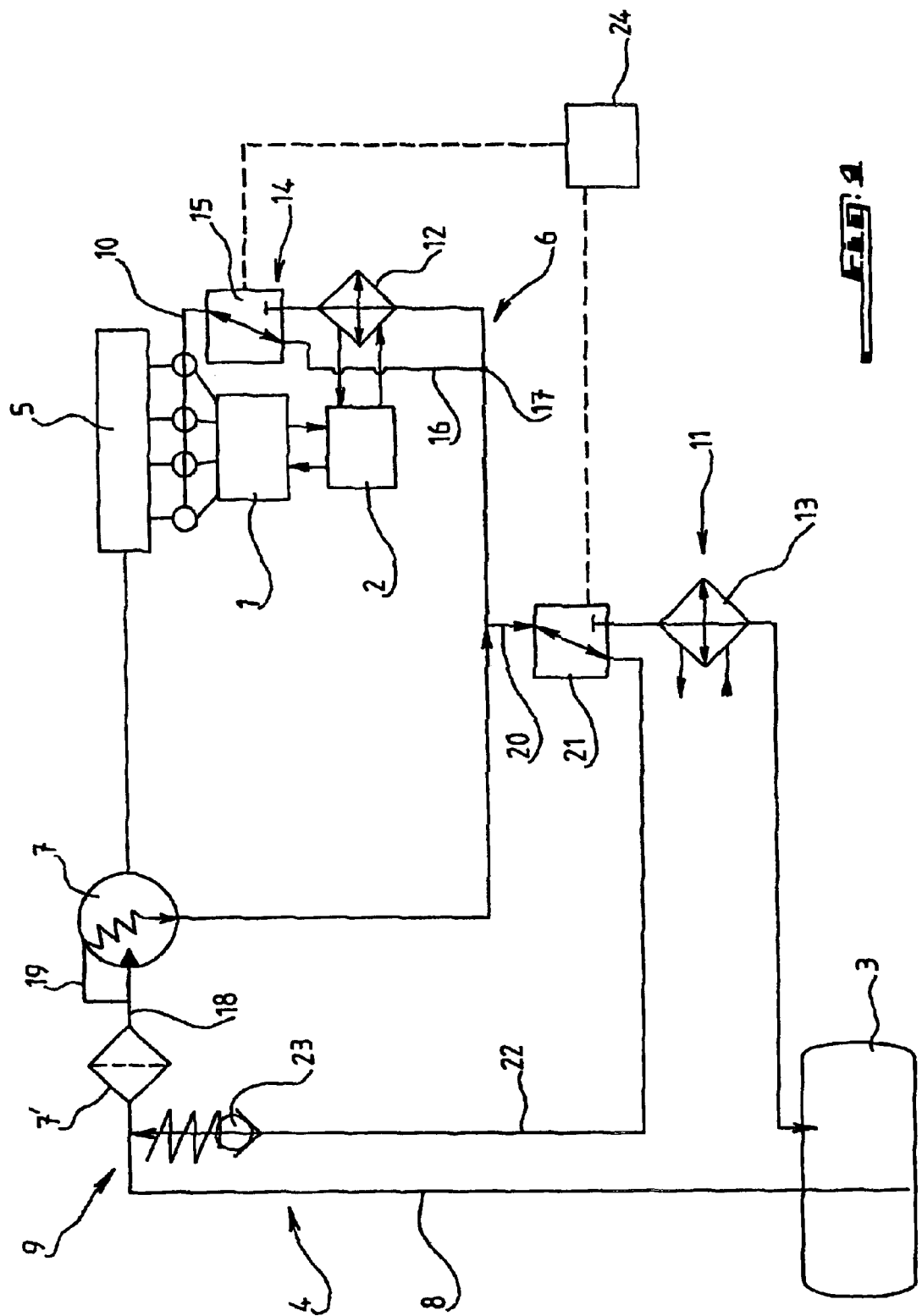

The present invention relates generally to fuel injection systems for diesel engines.

More precisely, the invention relates to a fuel injection system for a diesel engine which is cooled by a cooling water circuit, this system including a storage tank, a distribution circuit, an injection harness and a collection circuit, the distribution circuit including a pump ensuring the transfer under pressure of a flow of fresh fuel from the storage tank to the injector and a device for selective heating of the fresh fuel flow before introduction into the pump, the injection harness injecting a first portion of this fuel into the engine, a second portion forming a flow of non-injected fuel, and the collection circuit including a device for cooling of the flow of non-injected fuel and ensuring the selective return of this flow to the storage tank.

Systems of this type are already known in prior art, in particular through European Patent Application EP 0 304 742 which describes an injection circuit in which a portion of the flow of fuel delivered by the pump is removed before entering the injection harness, decreased in pressure by a pressure regulating valve and partially recycled upstream from the pump. The pressure release brings about heating of the fuel, which is used for pre-heating the fresh fuel coming from the storage tank, this fresh fuel being mixed with the recycled fuel before supplying the pump. The regulating valve is driven by an automatic control system, which also controls an all or nothing valve making it possible to interrupt the recycling of the fuel upstream from the pump. When the temperature of the fuel supplying the pump falls below a low threshold, the recycling valve is opened by the control system, and when this temperature exceeds a high threshold, the recycling valve is closed.

The injection system described by European Patent 0 304 742 also includes some means for cooling the fuel not injected into the engine, means which consist of a fan blowing air on a section of pipeline in the form of a spiral and on a heat exchanger, with the fuel circulating in the pipeline, in the exchange, or in both at once.

This system has shortcomings. First of all, the removal of a portion of the fuel between the pump and the injection harness reduces the quantity of fuel supplying the engine and therefore necessitates over-sizing of the pump, especially if the injection system is provided for functioning in zones where the climatic conditions are very severe.

Furthermore, the cooling capacity of the means mentioned above is limited by the thermal properties of air, which to an appreciable extent are not as good as those of an aqueous cooling liquid.

Application of the invention to systems containing high pressure injection pumps is therefore difficult, particularly because heating the fuel not injected into the engine is quite considerable.

In this context, the present invention aims to overcome the difficulties mentioned above.

For this purpose, the system according to the invention, which is in other respects in accordance with the generic definition given for it in the preamble above, is essentially characterized by the fact that the selective heating device includes a recycling line and a directing component making it possible to selectively recycle the non-injected fuel flow upstream from the pump, this flow being mixed with the fresh fuel flow coming directly from the tank.

In a possible embodiment of the invention, the pump, supplied with fuel by an upstream flow, can be cooled and/or lubricated by a stream diverted from the upstream flow, this diverted stream being mixed with the non-injected fuel flow and selectively recycled by the selective heating device upstream from the pump.

Advantageously, the cooling device can include a first cooling equipment item which selectively cools the non-injected fuel flow and a second cooling equipment item which selectively cools the non-injected fuel flow and the diverted stream for cooling/lubrication of the pump.

Preferably, the first cooling equipment can be a heat exchanger between the non-injected fuel flow, on one hand, and the engine cooling water circuit, on the other hand.

For example, the collection circuit can include a device for selective bypass of the first cooling equipment.

Advantageously, the second cooling equipment can be an air/fuel exchanger.

Preferably, the directing component can selectively adopt a first and a second position, the non-injected fuel flow and the diverted stream, mixed together, being directed upstream from the pump in the first position, and to the second cooling equipment in the second position.

For example, at least the bypass device and the directing component can be driven by a control device at least as a function of the exterior temperature, of the speed of the engine, of the pressure of the injection harness and of temperature measurements at one or more points of the distribution circuit, of the collection circuit and of the engine cooling water circuit.

Advantageously, the bypass device can include a three-way valve upstream from the first cooling equipment and a line joining this three-way valve to a point of the collection circuit situated downstream from the first cooling equipment.

Preferably, the directing component can be a three-way valve.

Figure 2:
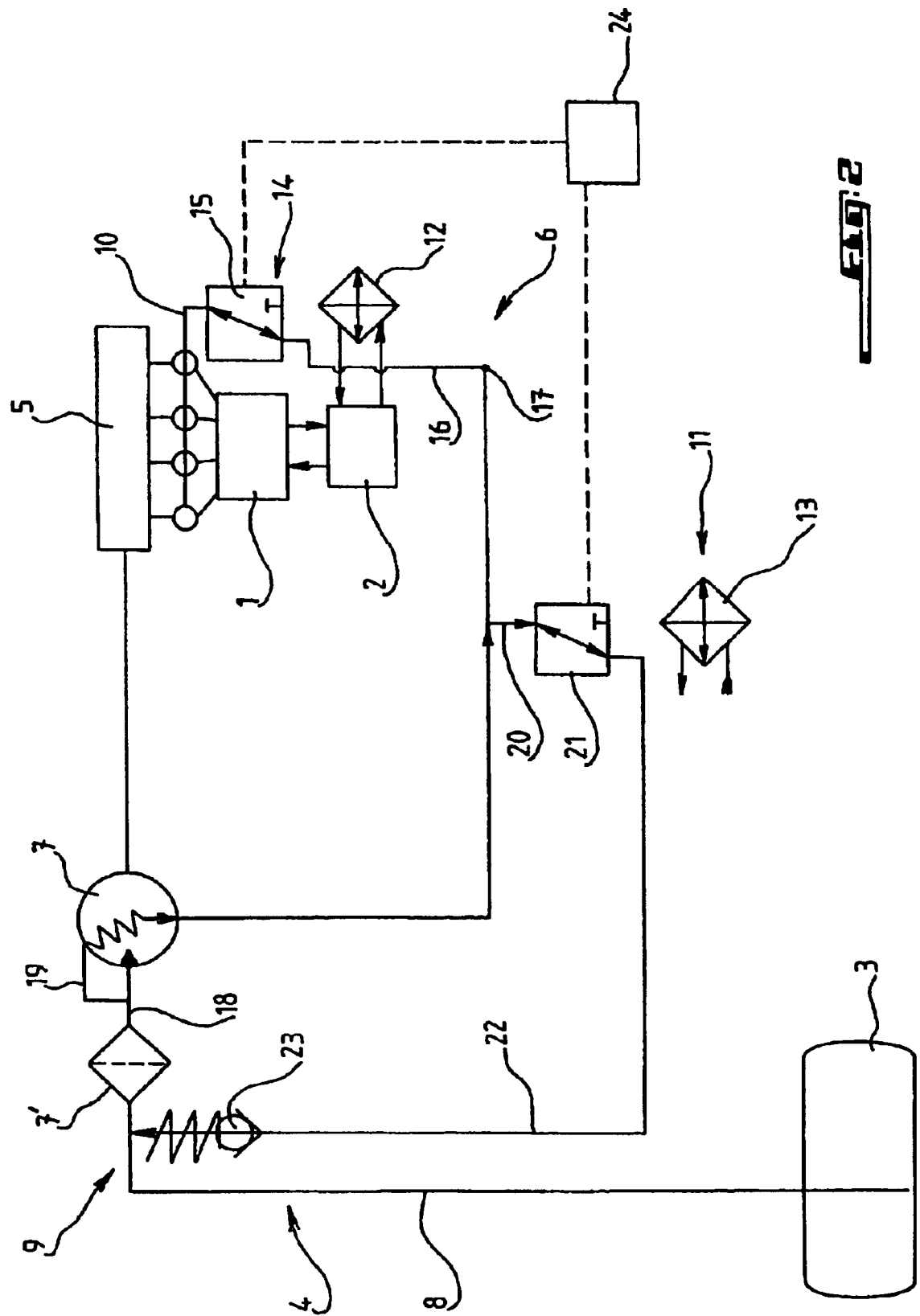
Figure 3:
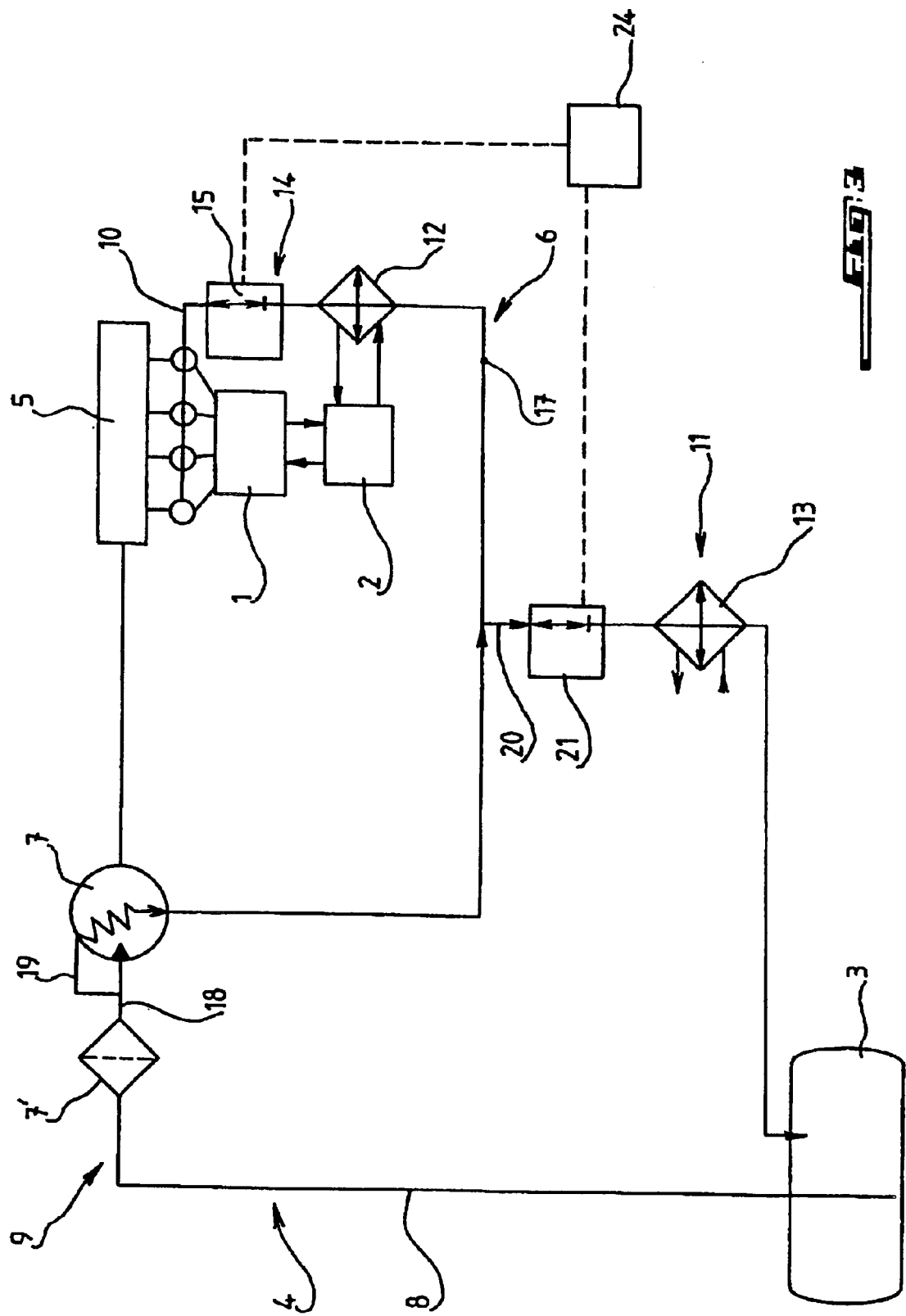
Figure 4:
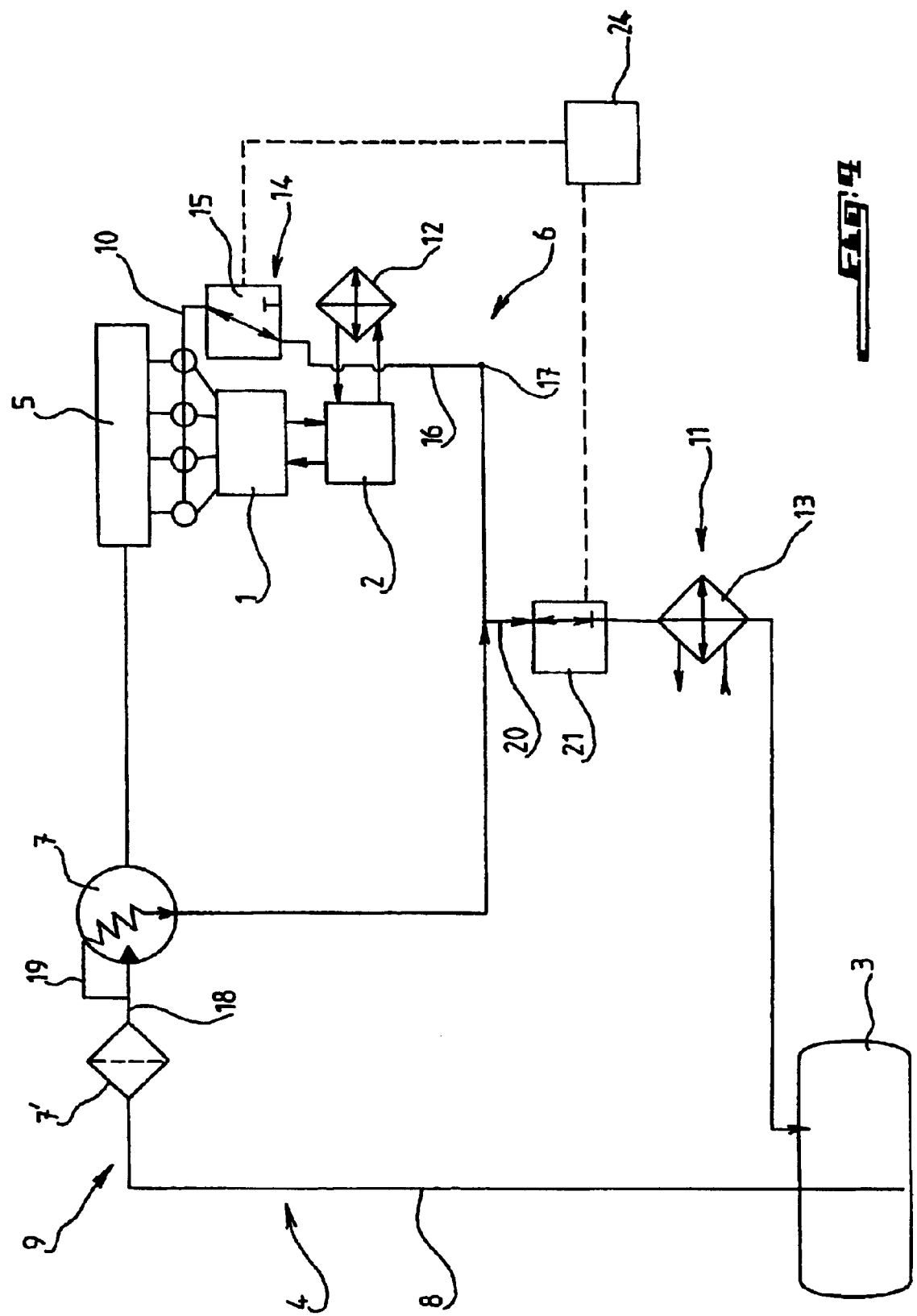

Other advantageous characteristics and properties of the invention will emerge from the description given for it below on an indicative and non-limiting basis, in reference to the appended drawings, in which:

FIG. 1 is a general diagram of the architecture of the injection system according to the invention, FIG. 2 shows the system of FIG. 1 under conditions of functioning corresponding to a cold exterior temperature and a medium engine speed, FIG. 3 shows the system of FIG. 1 under conditions of functioning corresponding to a very hot exterior temperature and a high engine speed, and FIG. 4 shows the system of FIG. 1 under conditions of functioning corresponding to a hot exterior temperature and a low engine speed.

As shown in FIG. 1, the invention relates to a fuel injection system, the fuel typically being Diesel oil, for diesel engine 1 cooled by cooling water circuit 2 in a known manner. The injection system includes fuel storage tank 3, fuel distribution circuit 4, injection harness 5 and circuit 6 for collection and return of a portion of the fuel to tank 3.

The distribution circuit includes pump 7, or another transfer means, ensuring the transfer under pressure of fresh fuel flow 8 from storage tank 3 to injector 5, and system 9 for selective heating of fresh fuel flow 8 before introduction into pump 7. The fuel goes through filter 7' before being introduced to the suction of pump 7.

Injection harness 5 injects only a portion of this fuel into engine 1. The rest of the fuel forms non-injected fuel flow 10 and undergoes a pressure release accompanied by heating roughly proportional to the delivery pressure of pump 7.

This non-injected fuel flow 10 is collected by collection circuit 6 which includes cooling device 11 and ensures the selective recycling of flow 10 to storage tank 3.

According to the invention, cooling device 11 includes first cooling equipment 12 arranged just downstream from injection harness 5 according to the direction of circulation of the fuel, and second cooling equipment 13.

This first cooling equipment 12 can be bypassed by bypass device 14 which includes three-way valve 15 upstream from first cooling equipment 12 and line 16 joining this three-way valve 15 to point 17 of collection circuit 6 situated downstream from first cooling equipment 12.

Three-way valve 15 selectively adopts a first and a second position, non-injected fuel flow 10 leaving injection harness 5 being directed towards first cooling equipment 12 in the first position and towards bypass line 16 in the second position.

The same result is obtained with a set of two all or nothing valves, one arranged on bypass line 16 and the other on the line supplying first cooling equipment 12.

Pump 7, supplied with fuel by upstream flow 18, is cooled and/or lubricated by stream 19 diverted from upstream flow 18. This diverted stream 19 is then mixed with non-injected fuel flow 10 downstream from point 17 of collection circuit 6 in order to form recycled flow 20.

Recycle flow 20 then goes through directing component 21 which selectively adopts a first and a second position, recycled flow 20 being directed upstream from pump 7 through recycling line 22 in the first position, and to second cooling equipment 13 in the second position.

Directing component 21 is typically made up of a three-way valve. Other solutions are possible, such as a set of two all or nothing valves, one arranged on the line for recycling to pump 7, the other arranged on the line supplying second cooling equipment 13.

Line 22 for recycling to pump 7 includes check valve 23. When recycled flow 20 is directed upstream from pump 7, it is mixed with fresh fuel flow 8 coming from storage tank 3 in order to form upstream flow 18 supplying pump 7.

In an execution variant, it is possible for recycling line 22 not to include check valve 23.

The mixing of fresh fuel flow 8 with recycled flow 20 consisting of fuel whose pressure has been lowered and which is therefore hot enables one to raise the temperature of fresh fuel flow 8. Selective heating device 9 then mainly consists of three-way valve 21 and recycling line 22.

In the second position of three-way valve 21, recycled flow 20 is directed towards second cooling equipment 13 which it passes through and then returns to storage tank 3.

First cooling equipment 12 is a heat exchanger between non-injected fuel flow 10, on one hand, and cooling water circuit 2 for engine 1, on the other hand. It is typically installed under the hood of the vehicle.

Second cooling equipment 13 is an air/fuel heat exchanger. The air flow can be created by a fan and/or by the movement of the vehicle, exchanger 13 in that case being arranged facing an air intake or a place which is open on the exterior such as, for example, under the body of the vehicle.

The injection system is driven by control device 24 as a function at least of the exterior temperature, of the speed of engine 1, of the pressure of injection harness 5 and of temperature measurements at one or more points of distribution circuit 4 and/or of collection circuit 6 and/or of cooling circuit 2 for engine 1.

Control system 24 selects the positions of three-way valves 15 and 21 in such a way as to maintain the temperature of the fuel introduced into pump 7 at a minimum temperature and to limit the temperature of non-injected fuel flow 10.

The first constraint comes essentially from the fact that the viscosity of the fuel increases rapidly at low temperature (−20 to −40° C.), which can lead to great difficulties in maintaining an adequate fuel supply flow and can go as far as to stop engine 1.

The second constraint comes from the heating of the fuel after pressure release, which can be quite considerable in the case of engines 1 provided with high pressure pumps 7, of engines with high cubic capacity or of engines with high non-injected fuel flows 10. In this case, it is possible to encounter problems of temperature withstand strength of the materials used in collection circuit 6 or in injection harness 5.

In an execution variant, the positions of three-way valves 15 and 21 are driven only by temperature measurements of the fuel in distribution circuit 4 and collection circuit 6.

The conditions of functioning of the injection system according to the invention will be described below for different cases in point.

The first case which is considered, illustrated in FIG. 2, corresponds to a low exterior temperature, on the order of minus 20° C., and a medium engine speed. In this configuration, one will of course seek to heat the fuel which supplies pump 7. This objective is attained by positioning three-way valve 15 in such a way that non-injected fuel flow 10 bypasses exchanger 12, and by positioning three-way valve 21 in such a way as to recycle recycled flow 20 upstream from pump 7. Non-injected fuel flow 10 and diverted stream 19, constituting recycled flow 20, are completely recycled and contribute their calories in order to heat very cold fresh fuel flow 8 coming from storage tank 3, which is at the surrounding temperature. In a typical case of functioning, it can be calculated that the caloric powers contributed respectively by non-injected fuel flow 10 and diverted stream 19 are respectively 800 W and 200 W, which therefore enables one to have a power of 1000 W for heating the cold fuel coming from storage tank 3.

The second case in consideration, illustrated in FIG. 3, corresponds to a very high exterior temperature on the order to 80° C., which can be obtained in certain cases after prolonged exposure in full sun, and to a high engine speed. In this configuration, one seeks to cool maximally non-injected fuel flow 10 and diverted stream 19. Heating of the fuel which supplies pump 7 is not necessary. This objective is attained by positioning three-way valve 15 in such a way that non-injected fuel flow 10 is cooled by exchanger 12, and by positioning three-way valve 21 in such a way that recycled flow 20 is cooled by exchanger 13 before being recycled in storage tank 3. In a typical case of functioning, it can be calculated that the caloric powers contributed respectively by non-injected fuel flow 10 and diverted stream 19 are respectively 2200 W and 375 W. First exchanger 12 makes it possible to evacuate 800 W in cooling circuit 2 for engine 1. Second exchanger 13 allows 1100 W to dissipate.

The third case considered, which is illustrated in FIG. 4, corresponds to a hot exterior temperature on the order of 40° C., and to a low engine speed. In this configuration, there is no need to heat fresh fuel flow 8 coming from storage tank 3, and the need to cool non-injected fuel flow 10 and diverted stream 19 is moderate. Three-way valve 15 is positioned in such a way that non-injected fuel flow 10 bypasses exchanger 12, and three-way valve 21 is positioned in such a way that recycled flow 20 is cooled by exchanger 13 before being recycled in storage tank 3. It should be noted that in this case, the temperature of the water of cooling circuit 2 for engine 1 can be higher than that of non-injected fuel flow 10, which makes the use of exchanger 12 unnecessary. In a typical case of functioning, it can be calculated that the caloric powers contributed respectively by non-injected fuel flow 10 and diverted stream 19 are respectively 600 W and 200 W. Second exchanger 13 allows 300 W to dissipate.

In an execution variant which is not represented in FIGS. 1 to 4, three-way valve 15 is replaced by one or more regulating valves making it possible to make only a portion of non-injected fuel flow 10 pass through exchanger 12 in order to regulate more finely the cooling of the recycled fuel. Likewise, three-way valve 21 is replaced by one or more regulating valves making it possible to recycle only a portion of recycled flow 20 upstream from pump 7 and to send another portion to exchanger 13 in order to regulate more finely the heating of the fuel supplying pump 7. This regulating valve or these regulating valves is (are) driven by a computer.

In another execution variant, other heat exchangers are placed in collection circuit 6, for example, in order to heat the passenger space of the vehicle.

What is claimed is:

1. A fuel injection system for a diesel engine which is cooled by a cooling water circuit, comprising a storage tank, a distribution circuit, an injection harness and a collection circuit, the distribution circuit including a pump ensuring the transfer of flow under pressure of fresh fuel from the storage tank to the injection harness, a selective heating device for selective heating of the fresh fuel before introducing the fresh fuel into the pump, the injection harness injecting a first portion of the fresh fuel into the engine, a second portion of the fresh fuel forming a non-injected fuel flow, the collection circuit including a device for cooling the non-injected fuel flow and ensuring the selective return of the non-injected fuel flow to the storage tank, the selective heating device including a recycling line and a directing component allowing selective recycling of the non-injected fuel flow upstream from the pump, the recycled non-injected fuel flow being mixed with fresh fuel flow coming directly from the tank, the pump, supplied with fuel by the upstream fuel flow, being cooled and/or lubricated by a stream diverted from the upstream fuel flow, the diverted stream being mixed with non-injected fuel flow, wherein the directing component selectively adopts a first position and a second position, directing the non-injected fuel flow and the diverted stream, mixed together, upstream from the pump in the first position, and to the storage tank in the second position.

2. The fuel injection system according to claim 1, wherein the cooling device includes a first cooling equipment which selectively cools the non-injected fuel flow and a second cooling equipment which selectively cools the non-injected fuel flow and the diverted stream for cooling/lubrication of the pump.

3. The fuel injection system according to claim 2, wherein the first cooling equipment is a heat exchanger between the non-injected fuel flow and the cooling water circuit for the engine.

4. The fuel injection system according to claim 2, wherein the collection circuit includes a bypass device for selective bypass of the first cooling equipment.

5. The fuel injection system according to claim 2, wherein the second cooling equipment is an air/fuel exchanger.

6. The fuel injection system according to claim 2, wherein the non-injected fuel flow and the diverted stream, mixed together, are directed toward the storage tank through the second cooling equipment in the second position of the directing component.

7. The fuel injection system according to claim 4, wherein the bypass device includes a three-way valve upstream from the first cooling equipment and a line joining the three-way valve to a point of the collection circuit situated downstream from the first cooling equipment.

8. The fuel injection system according to claim 1, wherein the directing component is a three-way valve.

9. The fuel injection system according to claim 4, wherein at least the bypass device and the directing component are driven by a control device at least as a function of the exterior temperature, of the speed of the engine, of the pressure of the injection harness and of temperature measurements at one or more points of the distribution circuit, of the collection circuit and of the cooling water circuit for the engine.

* * * * *